United States Patent
Pan et al.

(10) Patent No.: US 6,801,183 B2
(45) Date of Patent: Oct. 5, 2004

(54) TEMPERATURE COMPENSATION FOR LIQUID CRYSTAL CELL OPTICAL DEVICES

(75) Inventors: Jing-Jong Pan, Milpitas, CA (US); Xiangdong Qiu, Cupertino, CA (US); Hai-Ming Wu, Milpitas, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 178 days.

(21) Appl. No.: 10/119,538

(22) Filed: Apr. 10, 2002

(65) Prior Publication Data

US 2003/0201966 A1 Oct. 30, 2003

(51) Int. Cl.[7] .................................................. G09G 3/36
(52) U.S. Cl. ...................................................... 345/101
(58) Field of Search ............................. 345/101, 97, 50, 345/102, 98, 90, 87; 349/72, 84

(56) References Cited

U.S. PATENT DOCUMENTS

| | | | | |
|---|---|---|---|---|
| 5,088,806 A | * | 2/1992 | McCartney et al. | 359/84 |
| 5,113,275 A | * | 5/1992 | Patel et al. | 359/86 |
| 5,343,318 A | * | 8/1994 | Basturk | 359/75 |
| 5,617,234 A | * | 4/1997 | Koga et al. | 398/14 |
| 5,841,500 A | * | 11/1998 | Patel | 349/141 |
| 5,905,824 A | * | 5/1999 | Delisle et al. | 385/15 |
| 6,075,512 A | * | 6/2000 | Patel et al. | 345/101 |
| 6,671,443 B2 | * | 12/2003 | Deliwala | 385/125 |
| 2003/0053173 A1 | * | 3/2003 | Patel et al. | 359/156 |

* cited by examiner

Primary Examiner—Richard Hjerpe
Assistant Examiner—Ronald Laneau
(74) Attorney, Agent, or Firm—Ritter, Lang & Kaplan LLP

(57) ABSTRACT

A temperature compensation circuit arrangement for liquid crystal cells in optical devices is presented. In an optical device, a liquid crystal cell typically manipulates the optical signals according to an output optical property, such as attenuation, responsive to an AC voltage source electrical signal. A feedback circuit arrangement is connected to the liquid crystal cell and controls the current through the liquid crystal cell with respect to temperature by a predetermined control equations for the output optical property so that the device manipulates the optical signals independently of temperature. The current follows the control equations, which are empirically determined with respect to temperature for one equation.

11 Claims, 4 Drawing Sheets

TEMPERATURE COMPENSATION FOR LIQUID CRYSTAL CELL OPTICAL DEVICES

BACKGROUND OF THE INVENTION

The present invention is related to liquid crystal cell optical devices and, in particular, to temperature compensation techniques for such devices.

Liquid crystal cells have applications in many fields. Common uses include displays for laptop computers and for wireless telephones, for example. In fiberoptic networks alone, liquid crystal cells may be used in many devices, such as variable optical attenuators (VOAs), polarization controllers, optical switches and switch matrices, phase shifter or retarders, tunable waveplates, and tunable filters.

One drawback to the wide-spread adoption of liquid crystal cell optical devices is that liquid crystal cell operations are affected by changes in temperature. Liquid crystal cells may have different liquid crystals and the light paths through the cells may be varied; but the operation of the cell is generally the same. Some output property, e.g., intensity, polarization state, phase, of the light transmitted through (or reflected by) the cell may be modified by a voltage applied across the cell. As temperature changes, the relationship between the output property and the applied voltage changes. This drawback is significant for optical networks because typically network components are widely scattered and often exposed to ambient temperatures.

To compensate for this temperature dependency, various techniques have been used. A common technique is an electrical circuit with a temperature-sensitive diode by which the applied voltage to the liquid crystal cell is controlled, as illustrated in FIG. 1A. The diode is assumed to have an output voltage response similar to that of the liquid crystal cell so that with a proper scaling of the diode output voltage, the voltage applied to the liquid crystal cell changes according to temperature to make the desired output property of the liquid crystal cell invariant with temperature changes. However, this is only a rough compensation for temperature changes and in many applications, such as typically found in optical networks, is not sufficient.

FIG. 1B illustrates a much more accurate technique. An optical feedback loop taps off a small amount of the output optical signal from the liquid crystal device for direct monitoring of the output. The feedback loop controls the voltage applied to the liquid crystal cell responsive to the monitored output signal. This provides for a very accurate control in response to temperature change, but is very costly because optical monitoring devices are expensive, and additional insertion loss is introduced.

Still another technique uses a table in which parametric data for temperature, optical output property, and applied voltage are stored for the liquid crystal cell device, as symbolically illustrated by FIG. 1C. In response to the measured temperature, the table yields the suitable voltage for application to the liquid crystal cell for the desired output. This technique has some serious drawbacks, however. First, it is time-consuming to build such a parametric table, which must be made for each cell. Secondly, if the cell has hysteresis, then the table is ineffective because not only is the relationship between the output property and applied voltage temperature dependent, but the relationship also depends upon the path by which these values are reached.

On the other hand, the present invention avoids the deficiencies of these techniques with an elegantly simple electrical feedback loop, which effectively renders the output property of the liquid crystal cell invariant under changes of temperature.

SUMMARY OF THE INVENTION

The present invention provides for a liquid crystal cell optical device which manipulates optical signals independently over a range of temperatures. The device has a liquid crystal cell, which receives the optical signals and manipulates the optical signals according to an output optical property, such as attenuation, responsive to an electrical signal, and a circuit arrangement which is connected to the liquid crystal cell. The circuit arrangement controls a current of the electrical signal to the liquid crystal cell with respect to temperature by predetermined control equations for the output optical property so that the device manipulates the optical signals independently of temperature. The circuit arrangement comprises a feedback circuit so that the current of the electrical signal follows the control equations, one of which is empirically determined with respect to temperature.

DESCRIPTION OF THE SPECIFIC EMBODIMENTS

As described above, liquid crystal cells have applications in many optical devices, which are dependent upon a desired output optical property of the liquid crystal cell. For example, if the optical device is a VOA, then the reduction of the intensity of the input light, i.e., attenuation, by the liquid crystal cell, is the desired output optical property. Other output optical properties may be polarization, phase, wavelength, etc. Therefore, though described with respect to attenuation for a variable optical attenuator (VOA), it should be understood that the present invention is applicable to other liquid crystal cell optical devices besides VOAs.

Figure 1A:
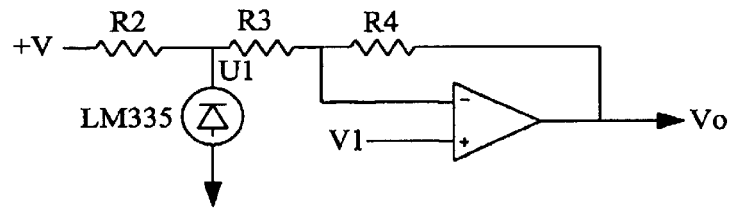
FIG. 1A illustrates a conventional feedback technique in which a diode is used to generate the feedback for a liquid crystal cell.
Figure 1B:
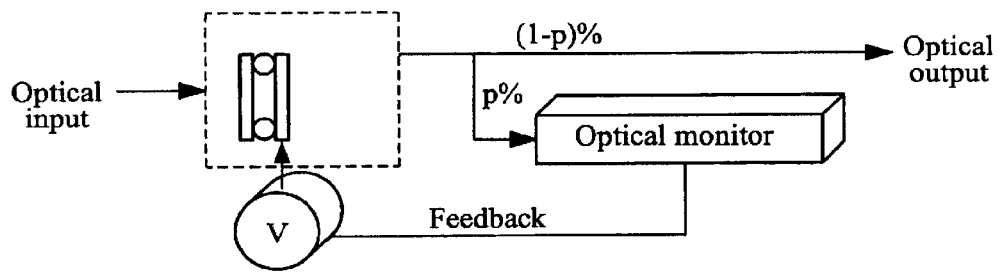
FIG. 1B illustrates a conventional optical feedback technique by which a portion of the optical output is used to control the output in a feedback loop.
Figure 1C:
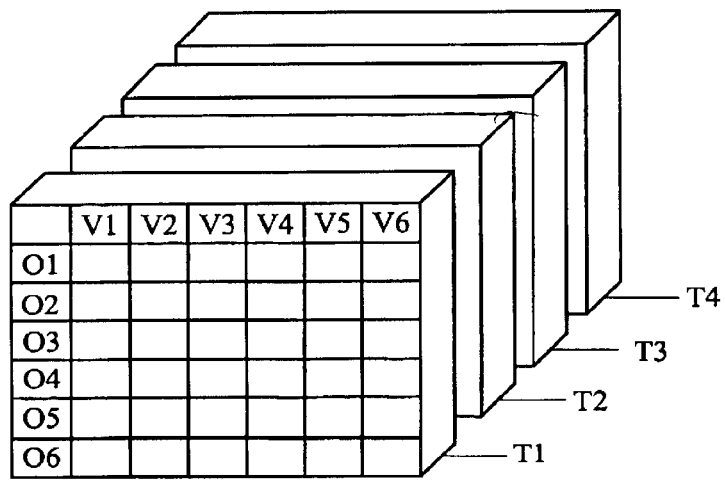
FIG. 1C symbolically illustrates a parametric table by which the applied voltage is controlled.
Figure 2:
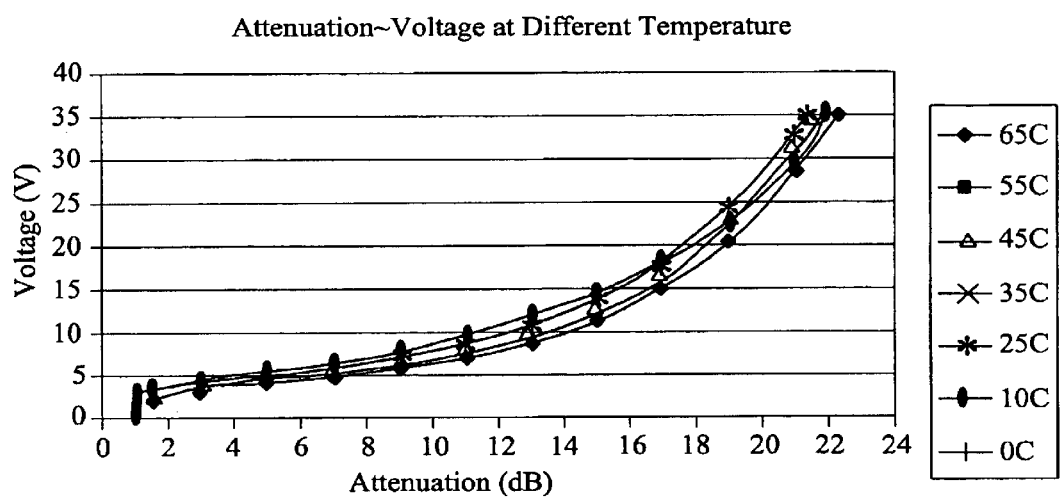
FIG. 2 is a plot of applied voltage versus attenuation for a liquid crystal VOA plotted for different temperatures.

FIG. 2 is a graph in which the voltage, or more precisely, the amplitude of the voltage, applied to a liquid crystal cell is plotted versus the resulting attenuation. The performance of the cell is also dependent upon temperature. As temperature rises, the attenuation increases greatly for fixed voltages. In this plot the temperature range is from 0° C. to 65° C. As explained with respect to FIGS. 1A–1C, efforts heretofore have not been entirely successful in compensating for temperature effects from either a performance aspect or from a cost aspect. On the other hand, the present invention provides for compensating for temperature effects, which is not only effective, but also low-cost.

In a liquid crystal cell VOA, both physical and electrical properties of the cell play a role in the attenuation of the liquid crystal VOA with respect to temperature. That is, with a given applied voltage, as temperature rises, both the viscosity of the liquid crystal material and the difference in indices of refraction, $\Delta n$, fall so that attenuation greatly increases. This is shown in FIG. 2.

Analytically, the output optical property of the VOA, attenuation, is as follows:

$$\text{Attenuation} = -10 \log(P_o/P_{in})$$

$$P_o/P_{in} \sim \sin^2(\Delta\Phi/2)$$

where $P_o/P_{in}$ is the output and input optical power of the VOA device, and $\Delta\Phi$ is the phase shift of the liquid crystal cell. But $$\Delta\Phi = f(n_{\textit{eff}}(T, \omega_{optical}), n_0(T, \omega_{optical}), d, \theta)$$

where $\omega_{optical}$ is the angular frequency of the optical signal passing through the liquid crystal cell, $n_{\textit{eff}}$ is the effective index of refraction of the liquid crystal cell, and $n_0$ is the index of refraction of the ordinary axis of the liquid crystal. Furthermore $$1/n_{\textit{eff}}^2 = \cos^2\theta/n_e^2(T, \omega_{optical}) + \sin^2\theta/n_0^2(T, \omega_{optical})$$

$$\in_\perp(T, \omega_{optical}) = [n_0(T, \omega_{optical})]^2$$

$$\in_\|(T, \omega_{optical}) = [n_e(T, \omega_{optical})]^2$$

where $\in_\perp$ and $\in_\|$ are respectively the perpendicular and parallel components of the dielectric tensor of the liquid crystal material. Hence the temperature dependency of the output optical property of the liquid crystal cell VOA, attenuation, is clearly shown.

Figure 3:
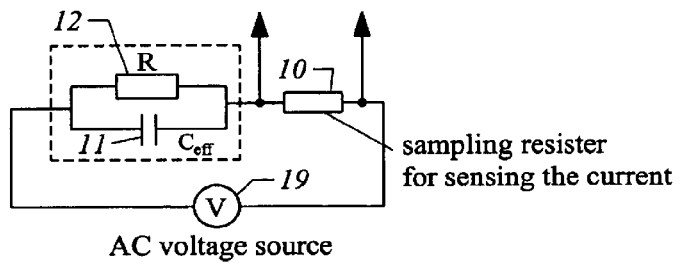
FIG. 3 is an equivalent electrical circuit representation of a liquid crystal cell in a test arrangement.
Figure 4:
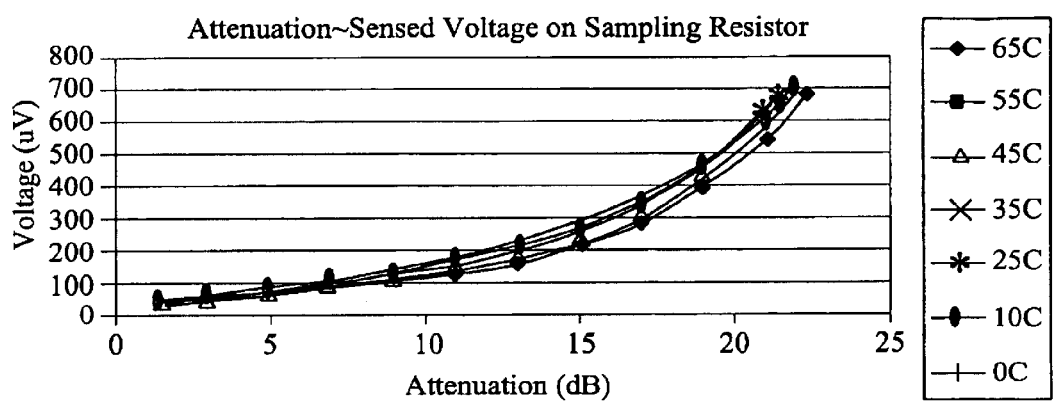
FIG. 4 is a plot of the voltage sensed through the sampling resistor in the FIG. 3 circuit arrangement versus attenuation at different temperatures for a particular liquid crystal VOA.

Electrically, a liquid crystal cell can be represented by a capacitor and resistor connected in parallel, such as a capacitor 11 with capacitance $C_{\textit{eff}}$ and a resistor 12 with resistance R, which are enclosed by a dotted line box in FIG. 3. The represented liquid crystal cell is driven by a typical AC voltage source 19 for driving a liquid crystal cell. The source 19 has an angular frequency $\omega_{electrical}$ and an amplitude U. Thus the current $i_r$ through the cell under the driving voltage is:

$$i_r = U(1/R + j\omega_{electrical} C_{\textit{eff}})$$

where j is the square root of $-1$.
The imaginary component of the current corresponds to a phase shift of 90° between the current flowing through the resistor 12 and the capacitor 11. With the driving voltage at a frequency of 1 KHz, and $C_{\textit{eff}}$ and R typical values for a liquid crystal cell, $1/R$ is much less than $\omega_{electrical}*C_{\textit{eff}}$. Therefore, $$i_r \approx U*(j\omega_{electrical} C_{\textit{eff}})$$

In fact, for the liquid crystal cells of the described VOAs, the current flowing through the capacitor are about 98% of the total current. But by a simplified analysis of the electrical properties of the liquid crystal cell:

$$C_{\textit{eff}} = \in_r(T, \theta, \omega_{electrical}) \in_0 A/d$$

where $\in_r$ is the permittivity of the liquid crystal; $\in_0$ is the permittivity in free space; T the temperature; $\omega_{electrical}$ the angular frequency of the applied voltage; A the surface area of the liquid crystal cell; $\theta$ an angle indicating the orientation of liquid crystal directors in the driving electric field; and d is the cell spacing;

$$\in_r = \in_\perp(T, \omega_{electrical})\cos^2\theta + \in_\|(T, \omega_{electrical})\sin^2\theta$$

where $\in_\perp$ and $\in_\|$ are the components of dielectric tensor of the liquid crystal material described above; and $$\theta = f(T, K_i, U, \in_\perp, \in_\|)$$

where $K_i$ are the elastic constants of the liquid crystals in the cell; and U is the amplitude of the applied voltage across the cell.

To find the relationship of the attenuation which is given by the optical phase $\Delta\phi$ with the properties of the applied electrical field, i.e., the applied voltage, the linkage between $\in(\omega_{optical})$ and $\in(\omega_{electrical})$ must be defined. Actually, $\in(\omega_{optical})$ and $\in(\omega_{electrical})$ are the same parameter in different electromagnetic wave frequency ranges (light being one kind of electromagnetic wave) and their relationship is (liquid crystal) materials dependent. However, for a particular liquid crystal material, the relationship can be found through mathematical curve fitting. According to the analysis above, through the bridging of $\in_\perp(T, \omega)$ and $E_\|(T, \omega)$, there is a constant relationship among T, $i_r$ and attenuation. This provides the possibility that by measuring the cell electrical parameters, the optical parameters of the devices can thus be controlled. However, the difficulty for the direct application of these equations is that the direct expression of most equations is not available and can only be determined by very complex experiments; hence the solution to these equations is only available in a numerical form.

In accordance with the present invention, the treatment of these equations is simplified with the following approximation by a normalization operation to cancel most complex relationships. That is, the attenuation in one state, Attenuation, divided by the attenuation in a second state, Attenuation$_0$, is related to the current I(T) corresponding to the first Attenuation state divided by the current $I_0(T)$ corresponding to the second attenuation state:

$$\text{Attenuation/Attenuation}_0 \sim I(T)/I_0(T)$$

Figure 5:
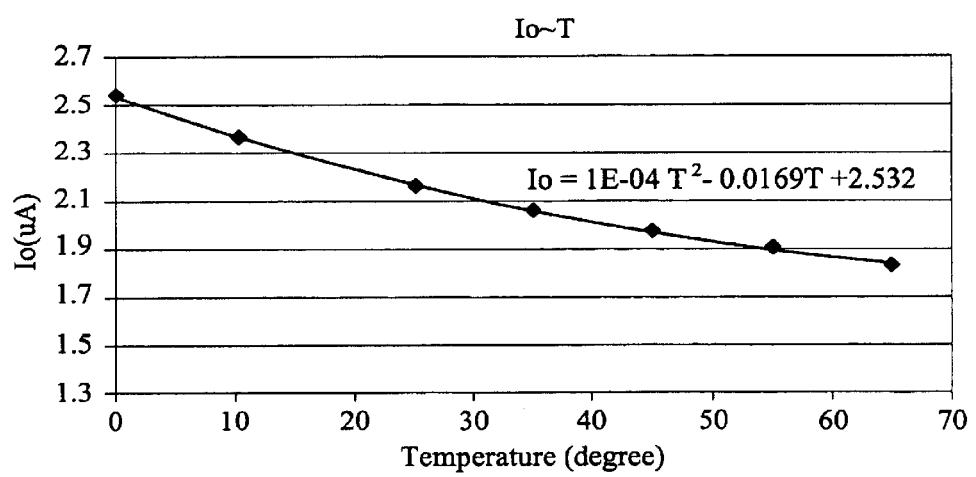
FIG. 5 is a data plot of current through a particular VOA liquid crystal cell with respect to temperature at a particular attenuation, with a fitted equation from the data, in accordance with the present invention.

If Attenuation$_0$ is set at a particular value, for example, Attenuation$_0$=9 dB, and the corresponding current $I_0$ is measured through the liquid crystal cell at different temperatures, the relationship between temperature and the current $I_0$ can be determined empirically. FIG. 5 is such a plot for the current $I_0$ versus temperature for fixed attenuation (9 dB) for a particular liquid crystal cell. From the plot a fitted curve can be found to fit the data. As shown by FIG. 5, the empirically fitted curve for the data is a simple quadratic equation for the relationship between the current $I_0$ for that attenuation (the compensation factor) and the temperature T, i.e., $$I_0 = AT^2 + BT + C \qquad \text{Eqn. (a)}$$

and in this example, A=+0.0001, B=−0.0169 and C=+2.532. It should be noted that this is a second order function and higher order or other type of functions could be used for different applications or accuracy requirements. $I_0$ is a control factor to compensate for temperature variations in the circuit arrangement described below.

With the Attenuation₀ set at a particular value, the approximation becomes:

$$\text{Attenuation} \sim I(T)/I_0(T)$$

Figure 6:
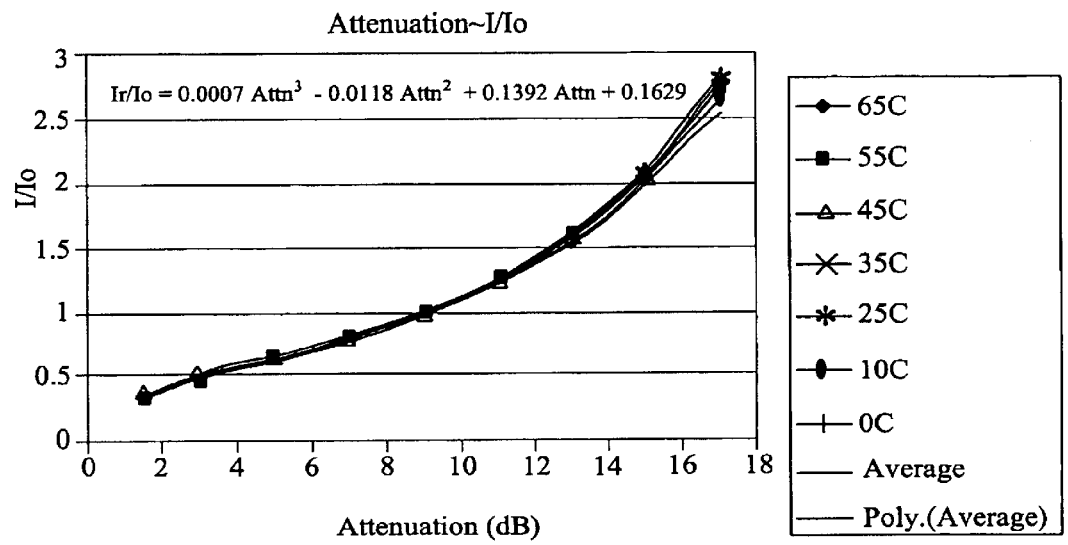
FIG. 6 is a data plot of $I/I_0$ versus attentuation at different temperatures for the VOA liquid crystal cell of FIG. 5, with a fitted equation from the data, in accordance with the present invention.

FIG. 6 plots $I(T)/I_0(T)$ versus Attenuation data for the liquid crystal cell and confirms the validity of the simplified approximation. The result shown in FIG. 6 is distinctive in that $(I/I_0)$ becomes the only factor of attenuation over the whole operational temperature range. From the data, a fitted curve is generated to determine the empirical relationship between $I/I_0$ as function of Attenuation, designated as $\alpha$, for the liquid crystal cell.

$$I/I_0 = D\alpha^3 + E\alpha^2 F\alpha + G \qquad \text{Eqn.(b)}$$

In this example, D=+0.0007, E=−0.0118, F=+0.1392 and G=+0.1629. This feature makes it possible to use two simple equations(Attenuation and $I_0$), instead of high-dimensional and complex parametric tables, for easily controlling the VOA attenuation in spite of changes in temperature. For example, at temperature T=50° C., current $I_0$=1.92 µA is given by Eqn. (a). If Attenuation is to be set at 10 dB, Eqn. (b) yields the target current I=2.06 µA. In other words, the current through the liquid crystal cell should be 2.06 µA to obtain attenuation=10 dB.

Figure 7:
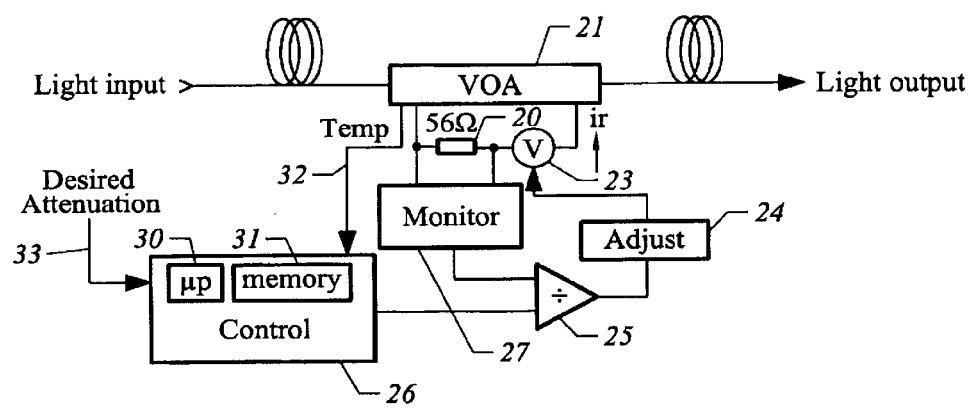
FIG. 7 is an electrical circuit arrangement for controlling the current to the VOA liquid crystal cell so that attenuation is unaffected by changes in temperature in accordance with the present invention.

FIG. 7 illustrates a circuit arrangement for controlling the current to a VOA, in accordance to one aspect of the present invention. The particular liquid crystal cell for which $I_0$ has been determined is used in the VOA 21. As in the previously described test arrangement, the liquid crystal cell is driven by an AC voltage source 23 and a sampling resistor 20 is placed in the path of the current driven by the source 23 to provide a measure of the actual current $i_r$ through the liquid crystal cell of the VOA 21. For accuracy of operation, if not the same sampling resistor, the resistor 20 is either the sampling resistor used to determine Eqns. (a) and (b), or has the same resistance as the sampling resistor.

A negative feedback circuit is formed by an adjusting circuit 24, a discriminator circuit 25, a control circuit 26 and a monitoring circuit 27. The monitoring circuit 27 is connected across the sampling resistor 20 and generates a voltage corresponding to the current $i_r$ through the sampling resistor 20 as one input to the discriminator circuit 25. The control circuit 26 generates a voltage corresponding to the target current I, which the actual current $i_r$ should match, as a second input to the discriminator circuit 25. For achieving or maintaining a specific attenuation, as in the example described above, the target current I is determined from the Eqns. (a) and (b). The discriminator circuit 25 generates an output signal for the adjusting circuit 24 which controls the voltage source 23, and the voltage source 23 controls the voltage amplitude across the liquid crystal cell of the VOA 21. Operationally, the output of the discriminator circuit 25 is responsive to the difference between the two input signals from control circuit 26 and the monitoring circuit 27 so that the actual current $i_r$ through the liquid crystal cell is maintained at the target value I.

The control circuit 26 also receives an input for temperature as shown by a line 32 for a temperature reading of the liquid crystal cell of the VOA 21. If the VOA 21 is variable, the control circuit 26 also has another input 33 to receive the desired attenuation. The control circuit 26 also has a microprocessor 30 with a memory 31, as illustrated in FIG. 7. The memory 31 stores the Equations (a) and (b) with their empirically determined constants, i.e., A–G, and code to calculate $I_0$ and $I/I_0$, given the desired attenuation and the temperature, which are also stored in the memory 30. The control circuit 26 generates the voltage corresponding to the target current I for the discriminator circuit 25. The memory 31 is preferably in the form of flash memory so that the contents of the memory is maintained without power. Alternatively, a microcontroller with suitable memory may be used in place of the microprocessor 30 and memory 31.

The net result is that the attenuation through the VOA 20 remains constant at the designated value even as temperature changes. This is a highly useful function because VOAs are often used to balance the signal strengths of different communication channels, such as WDM channels. The present invention provides an automatic balance of signal strengths by maintaining the signal strengths constant over changes in temperature.

Thus for each liquid crystal cell, the fitted $I_0$ control curve over temperature, and the fitted $I/I_0$ curve over attenuation are found for each liquid crystal cell. These curves are stored in the memory of the control circuit 26. These same steps may be repeated for other desired output optical properties for a liquid crystal cell in a different optical device. A different characteristic control equation (and a different $I/I_0$ versus output optical property) is found for the liquid crystal cell.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A device for manipulating optical signals independently of temperature, said device comprising
    a liquid crystal cell receiving said optical signals and manipulating said optical signals with respect to an output optical property responsive to an electrical signal, and
    a circuit arrangement connected to said liquid crystal cell for controlling a current of said electrical signal to said liquid crystal cell with respect to temperature by predetermined control equations for said output optical property so that device manipulates said optical signals independently of said temperature.

2. The device of claim 1 wherein said circuit arrangement comprises a feedback circuit so that said current of said electrical signal follows said control equations with respect to temperature.

3. The device of claim 1 wherein said electrical signal to said liquid crystal cell is generated from an AC voltage source; and wherein said feedback circuit arrangement comprises
    a sampling resistor in an electrical path between said AC voltage source and said liquid crystal cell, said current of said electrical signal passing through said sampling resistor;
    a monitoring circuit connected to said sampling resistor for generating a first electrical signal proportional to an amount of said current of said electrical signal passing through said sampling resistor;
    a control circuit for generating a second electrical signal responsive to said temperature according to said predetermined control equations; and
    a discriminator circuit connected to said monitoring circuit and control circuit and responsive to the difference between said first and second electrical signals for generating an output signal so that said current of said electrical signal passing through said sampling resistor is maintained at a current determined by said control equations.

4. The device of claim 3 further comprising an adjusting circuit connected to said discriminator circuit and said AC voltage source for generating a control signal for said AC voltage source responsive to said discriminator circuit output signal.

5. The device of claim 1 wherein said output optical property comprises attenuation and said device comprises a variable optical attenuator.

6. The device of claim 4 wherein said predetermined control equations each comprises a fitted curve equation from empirical data.

7. The device of claim 6 wherein one of said predetermined control equations comprises a first current of said electrical signal to said liquid crystal cell versus temperature for a fixed attenuation value.

8. The device of claim 7 wherein a second of said predetermined control equations comprises a ratio of a current of said electrical signal to said liquid crystal cell to said first current versus attenuation independent of temperature.

9. The device of claim 1 wherein said device comprises one selected from the group comprising polarization controllers, optical switches, switch matrices, optical modulators, phase shifters, phase retarders, tunable waveplates and tunable filters.

10. The device of claim 1 wherein said predetermined control equations are empirically determined.

11. The device of claim 10 wherein said predetermined control equations are determined for a selected output optical property value.

* * * * *